United States Patent
Gallant et al.

(10) Patent No.: US 7,192,266 B2
(45) Date of Patent: Mar. 20, 2007

(54) MOLDING DEVICE INSERTS

(75) Inventors: Christopher M. Gallant, Nottingham, NH (US); William P. Clune, Hillsborough, NH (US); James W. Babineau, Melrose, MA (US)

(73) Assignee: Velera Industries, Curacao (AN)

( * ) Notice: Subject to any disclaimer, the term of this patent is extended or adjusted under 35 U.S.C. 154(b) by 0 days.

(21) Appl. No.: 10/952,104

(22) Filed: Sep. 28, 2004

(65) Prior Publication Data
US 2006/0066002 A1    Mar. 30, 2006

(51) Int. Cl.
B29C 33/38    (2006.01)

(52) U.S. Cl. ...................... 425/363; 425/471

(58) Field of Classification Search ............... None
See application file for complete search history.

(56) References Cited

U.S. PATENT DOCUMENTS

| | | | |
|---|---|---|---|
| 3,507,010 A * | 4/1970 | Doleman et al. ........... 425/134 |
| 3,590,109 A * | 6/1971 | Doleman et al. ........... 264/167 |
| 3,762,000 A * | 10/1973 | Menzin et al. ................ 24/452 |
| 4,383,670 A * | 5/1983 | Olschewski et al. ......... 249/60 |
| 4,794,028 A | 12/1988 | Fischer |
| 5,167,895 A | 12/1992 | Lueghamer et al. |
| 5,875,527 A | 3/1999 | Lacey et al. |
| 5,900,350 A | 5/1999 | Dowd et al. |
| 5,922,222 A | 7/1999 | Jens et al. |
| 5,971,738 A | 10/1999 | Jens et al. |
| 5,980,230 A | 11/1999 | Buzzell et al. |
| 6,039,556 A | 3/2000 | Jens et al. |
| 6,099,289 A | 8/2000 | Jens et al. |
| 6,163,939 A | 12/2000 | Lacey et al. |
| 6,202,260 B1 | 3/2001 | Clune et al. |
| 6,258,311 B1 | 7/2001 | Jens et al. |
| 6,280,670 B1 | 8/2001 | Buzzell et al. |
| 6,287,665 B1 * | 9/2001 | Hammer ..................... 428/100 |
| 6,432,339 B1 * | 8/2002 | Jens et al. .................. 264/167 |
| 6,640,348 B1 | 11/2003 | Provost et al. |
| 6,902,389 B2 * | 6/2005 | Gorman et al. ............. 425/363 |
| 7,029,265 B2 * | 4/2006 | Plammer .................... 425/328 |
| 2001/0000117 A1 * | 4/2001 | Gorman et al. ............. 264/167 |
| 2002/0022108 A1 | 2/2002 | Krantz et al. |
| 2002/0190418 A1 * | 12/2002 | Jens et al. .................. 264/166 |
| 2003/0012921 A1 | 1/2003 | Gallant et al. |
| 2003/0034583 A1 | 2/2003 | Provost |

FOREIGN PATENT DOCUMENTS

EP    1042971 A1    11/2000

OTHER PUBLICATIONS

European Search Report (05021168.9), mailed Dec. 23, 2005.

* cited by examiner

Primary Examiner—Mark Eashoo
(74) Attorney, Agent, or Firm—Fish & Richardson P.C.

(57) ABSTRACT

A molding apparatus for forming a sheet-form fastener product includes a mold roll that is rotatable about an axis of rotation and has a circumferential surface defining a plurality of apertures that extend inwardly from the circumferential surface. Multiple inserts having first and second ends are retained within corresponding apertures of the mold roll such that the first end of each insert is directed toward the circumferential surface of the mold roll. The inserts have surfaces that at least partially define blind molding cavities shaped to mold, from molten resin forced into the molding cavities from the circumferential surface of the mold roll, an array of fastener elements having overhanging heads for releasable engagement with a mating fastener product.

30 Claims, 9 Drawing Sheets

MOLDING DEVICE INSERTS

TECHNICAL FIELD

This invention relates to fastener products, and to methods and apparatuses for the production of fastener elements.

BACKGROUND

Fastener products can be formed in a continuous process using an apparatus, which includes, among other things, a mold roll. Such mold rolls typically are comprised of multiple, thin plates that are stacked together. Along a circumferential surface of each plate molding surfaces are etched or otherwise formed within the plates. When the plates are aligned along a central axis, the molding surfaces of the plates cooperate with adjacent, flat plates to define very small molding cavities. These cavities are often hook-shaped. Generally, the fastening hooks are formed in the machine direction (i.e., the longitudinal direction of the resulting fastener product).

It is also possible to form fastener elements using an injection mold having multiple plates stacked together. Many of the plates cooperate with adjacent flat plates to define cavities. Unlike conventional mold rolls, conventional injection molding is a discrete shot molding process (i.e., a discontinuous linear movement).

To form fastener elements using a mold roll or injection mold, molten resin is forced into the cavities. The molten resin is then allowed to cool and harden while within the cavity. Finally, the hardened resin is stripped from the cavity exposing newly molded projections extending from a newly formed base.

Due to the configuration of plates in conventional mold rolls, it is much easier to mold fastener elements oriented in the machine direction (i.e., the longitudinal direction of the fastener product) than in other directions. However, fastener element heads overhanging in a cross-machine direction would be useful in some applications.

Conventional mold rolls are expensive, and damage to cavities within the conventional mold roll frequently results in costly repairs or even replacement of the entire mold roll. Due to the mold roll configuration, it is difficult and time-consuming to repair or replace the affected plate or plates.

SUMMARY

In one aspect of the invention, a molding apparatus for forming a sheet-form fastener product includes a mold roll that is rotatable about an axis of rotation and has a circumferential surface defining a plurality of apertures therein. The apertures extend inward from the circumferential surface of the mold roll. A plurality of inserts, each having a first end and a second end, are retained within corresponding apertures of the mold roll such that the first end of each insert is directed toward the circumferential surface of the mold roll. The inserts have surfaces that at least partially define blind molding cavities shaped to mold, from molten resin forced into the molding cavities from the circumferential surface of the mold roll, an array of fastener elements having overhanging heads for releasable engagement with a mating fastener product.

In another aspect of the invention, a method of producing a fastener product having a multiplicity of fastener elements extending from a base includes providing a mold roll having a circumferential surface defining an array of apertures. The apertures extend inward from the circumferential surface. Inserts are disposed within the apertures. The inserts have surfaces at least partially defining blind molding cavities. Molten resin is introduced to the circumferential surface of the mold roll under pressure conditions, forcing some of the resin into the molding cavities to mold an array of fastener elements integrally with resin disposed at the circumferential surface of the mold roll. And then, the resin is stripped from the mold roll.

Embodiments may include one or more of the following.

In some embodiments, the apertures extend along the circumferential surface of the mold roll in a direction substantially parallel to the axis of rotation of the mold roll.

In certain embodiments, the apertures extend from a first side of the mold roll to a second side of the mold roll.

In some embodiments, the molding cavities are completely defined within the inserts.

In certain embodiments, multiple molding cavities are completely defined within each insert.

In certain embodiments, first molding cavities are defined between first sides of the inserts and the mold roll. In some embodiments, second molding cavities are defined between second sides of the inserts and the mold roll. In certain embodiments, at least some of the first molding cavities include crook portions and at least some of the second molding cavities include crook portions. In some embodiments, the crook portions of the first molding cavities face in a direction substantially opposite the crook portions of the second molding cavities. In certain embodiments, the crook portions of the first and second molding cavities face in a direction transverse to the mold roll.

In certain embodiments, the molding cavities extend from first sides of the inserts to second sides of the inserts.

In some embodiments, the inserts comprise an upper portion and a lower portion, the lower portion including a first segment extending transversely beyond a first side of the mold roll and a second segment extending transversely beyond a second side of the mold roll.

In certain embodiments, a first retainer cap is secured to the first side of the mold roll and a second retainer cap secured to the second side of the mold roll. The retainer caps have inner portions conforming to the first and second segments of the inserts to retain the inserts within the apertures.

In some embodiments, each of the inserts has a width of about 0.01 inch to about 0.125 inch.

In certain embodiments, the mold roll comprises a sleeve having an inner surface, and the array of apertures extend from the inner surface to the circumferential surface of the sleeve.

In certain embodiments, the molding cavities are defined by perimeter portions of the inserts and the mold roll.

In some embodiments, multiple molding cavities are defined by the perimeter portion of each insert and the mold roll.

In certain embodiments, each of the multiple molding cavities includes a crook portion extending in the same direction along the insert.

In some embodiments, a first molding cavity is defined by a first perimeter portion of each insert and the mold roll, and a second molding cavity is defined by a second perimeter portion of each insert and the mold roll, the second perimeter portion being substantially opposite the first perimeter portion.

In certain embodiments, the first molding cavity and the second molding cavity include crook portions, and the crook portion of the first molding cavity faces in a direction along the insert opposite the crook portion of the second molding cavity.

In some embodiments, the first molding cavity and the second molding cavity include crook portions, and the crook portions of the first and second molding cavities face in the same direction along the insert.

In certain embodiments, the mold roll includes a mandrel, and the sleeve is disposed around the mandrel.

In certain embodiments, the inserts include first portions and second portions. The first portions of the inserts are positioned within first portions of the apertures, and the second portions of the inserts are positioned within second portions of the apertures.

In certain embodiments, the first portions of the inserts and apertures are substantially cylindrical and the second portions of the inserts and apertures are substantially disk-shaped, and the second portions having a larger diameter than the first portions.

In certain embodiments, bottom surfaces of the second portions of the inserts are shaped to conform to the mandrel.

In certain embodiments, the inserts are configured to be positioned within the apertures in any of a plurality of orientations.

In certain embodiments, the resin is introduced into a nip defined by the mold roll and an adjacent pressure device.

In certain embodiments, the pressure device comprises a counter-rotating pressure roll.

In certain embodiments, the pressure device comprises an extruder that extrudes the resin into the nip.

In certain embodiments, the nip is defined by the mold roll and an arcuate shaped housing of the extruder.

In certain embodiments, the inserts include an upper portion and a lower portion, the lower portion including a first segment extending transversely beyond a first side of the mold roll and a second segment extending transversely beyond a second side of the mold roll.

In certain embodiments, a first retainer cap is secured to the first side of the mold roll, and a second retainer cap is secured to the second side of the mold roll. The retainer caps have inner portions conforming to the first and second segments of the inserts to retain the inserts within the apertures.

In certain embodiments, the mold roll includes a sleeve having an inner surface, and the array of apertures extends from the inner surface to the circumferential surface of the sleeve.

In certain embodiments, the sleeve is disposed around a mandrel to retain the inserts within the apertures.

Embodiments may include one or more of the following advantages.

The inserts may be oriented in any radial direction within the apertures in some cases. The inserts can be arranged to product cross-direction fastener hooks. The inserts can be arranged to produce non-directional fastener products (e.g., products that provide peel and shear resistance in substantially every direction along the base of the product). In some cases, the inserts can be removed from the apertures, which allows for easy cleaning, repair, and replacement of the inserts.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
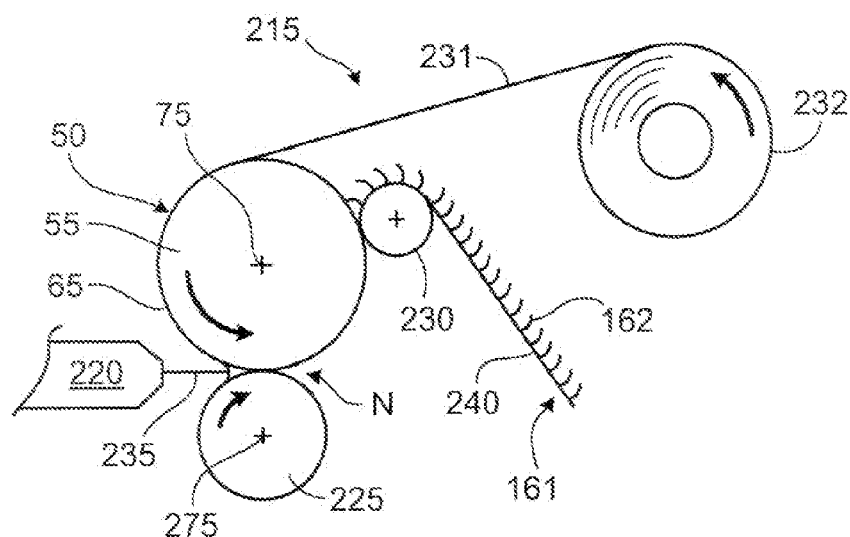
FIG. 1 is a side view of a first apparatus for making fastener products.

Referring to FIG. 1, an apparatus 215 for making fastener products includes a molding apparatus 50, an extruder 220, a pressure roll 225, a stripping roll 230, and a sheet-form material 231. The apparatus 215 can be used to mold various types of fastener elements, such as fastener hooks.

During use of apparatus 215, sheet-form material 231 is held in tension between a roll 232 of sheet-from material 231, mold roll 55, and stripping roll 230. Sheet-form material 231 may be comprised of one or more of several suitable materials. For example, sheet-form material 231 may be a loop material, a non-woven fabric, a reinforcing scrim, a porous material, paper, or foam.

Figure 3:
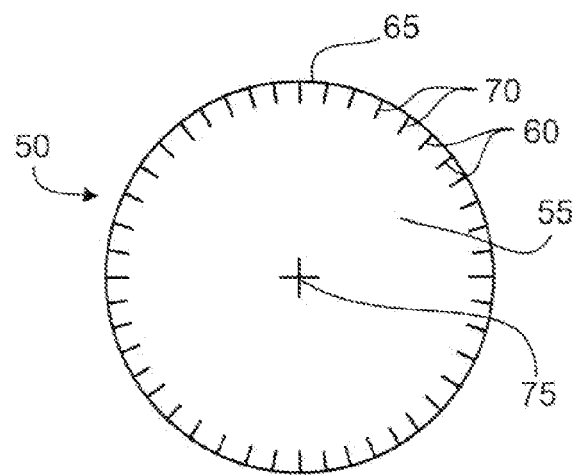
FIG. 3 is a cross-sectional view of a first mold roll.

Referring briefly to FIG. 3, molding apparatus 50 is comprised of a mold roll 55 and a plurality of inserts 60. Mold roll 55 includes an array of apertures 70 extending inward from a circumferential surface 65 toward an axis of rotation 75. Inserts 60, which at least partially define multiple molding cavities 130 (shown in FIG. 4), are retained within apertures 70, as described below.

Referring again to FIG. 1, mold roll 55 is positioned adjacent pressure roll 225 such that their axes of rotation 75, 275 are substantially parallel to one another. A nip N is created between circumferential surface 65 of mold roll 55 and an adjacent surface of pressure roll 225. Mold roll 55 and pressure roll 225 rotate counter to one another, which creates a large amount of pressure within nip N.

Extruder 220 extrudes a molten resin 235 into a nip N where it meets sheet-form material 231. Molten resin 235 may comprise one or more of various thermoplastics and other resins. A high density polyethylene, such as Exxon Mobil #6908, can be useful for some applications. Other suitable materials include low density polyethylene (LDPE), polypropylene, and nylon, for example.

As sheet-form material 231 and molten resin 235 are conveyed through nip N, the high nip pressure forces some of the molten resin 235 into cavities 130 to mold an array of fastener elements 162 while the remainder of molten resin 235 is compressed between circumferential surface 65 and an adjacent surface of pressure roll 225 to form a common base 240 from which fastener elements 161 extend. In addition, the high nip pressure may bond common base 240 to sheet-form material 231. However, other suitable bonding methods may also be used. For example, a heat-sensitive adhesive may be applied to one side of sheet-form material 231 and heat may be applied at a later time to adhesively bond common base 240 to sheet-form material 231.

After molten resin 235 has been forced into cavities 130, molten resin 235 is allowed to cool and harden within cavities 130. Mold roll 55 and pressure roll 225 may be internally cooled by water, for example, to facilitate the cooling of molten resin 235. After cooling and hardening, resin 235 has a shape permanently corresponding to the shape of cavities 130. In particular, molten resin 235 can be in the shape of a fastener element, such as a hook (e.g., a J-hook, a palm-tree-shaped hook, or a mushroom-shaped hook).

Sheet-form material 231 is then conveyed along mold roll 55 toward stripping roll 230. And then, sheet-form base 231 is conveyed around stripping roll 230. This causes some of fastener elements 162, which have been allowed to cool and harden, to be stripped from cavities 130. At this point, a fastener product having an array of fastener elements 162 extending from common base 240 is exposed.

Figure 2:
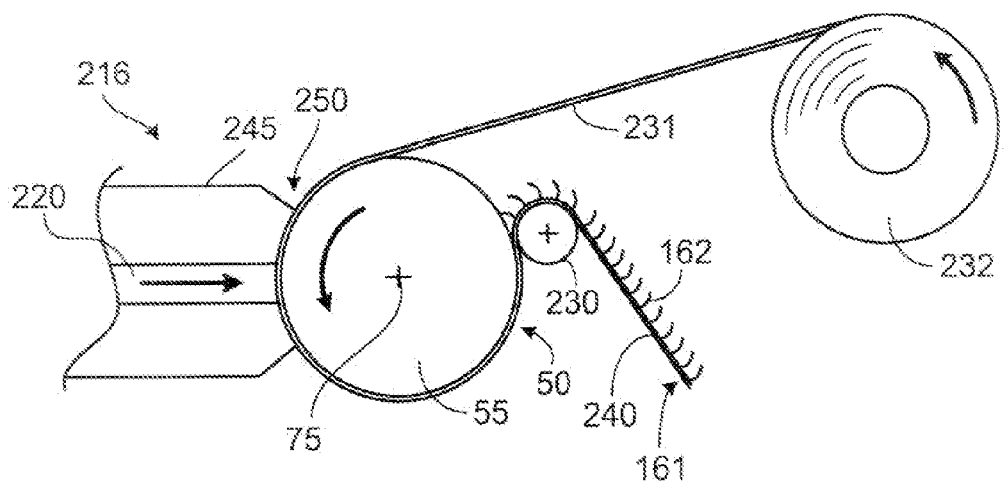
FIG. 2 is a cross-sectional view of a second apparatus for molding fastener products.

Referring to FIG. 2, an alternative apparatus 216 for producing fastener products 161 includes molding apparatus 50, an extruder 220, an extruder housing 245, stripping roll 230, and sheet-form material 231. As represented in FIG. 3, molding apparatus 50 includes mold roll 55 and a plurality of inserts 60. Mold roll 55 defines multiple apertures 70 therein, and a plurality of inserts 60 are retained within apertures 70 to define cavities 130 (shown in FIG. 4).

Extruder housing 245 is disposed around extruder 220. Extruder housing 245 is arcuate-shaped to define a predetermined gap 250 between extruder housing 245 and circumferential surface 65 of mold roll 55. Molten resin 235 is extruded through extruder 220 and into gap 250.

In this embodiment, sheet-form material 231 is preferably a porous material. As sheet-form material 231 is conveyed around mold roll 55, extruder 220 forces molten resin 235 both onto and through sheet-form material 231. Due to the porosity of sheet-form material 231, some of resin 235 passes through sheet-form material 231 and into cavities 130 to form fastener elements 162, while the remainder of resin 235 adheres to sheet-form material 231 to form common base 240 from which fastener elements 162 extend. Molten resin 235 is allowed to cool and harden before being stripped out of cavities 130 by stripping roll 230 to expose a newly formed fastener product having fastener elements 162 extending from common base 240.

As shown in FIG. 3, molding apparatus 50 includes a mold roll 55 and a plurality of inserts, blades, or plugs 60. Mold roll 55 defines an array of apertures, slots, or bores 70, which extend inward from circumferential surface 65 toward axis of rotation 75. In some embodiments, bores 70 extend substantially perpendicular to the circumferential surface 65. In certain embodiments, bores 70 extend at an angle of less than about 90 degrees (e.g., less than about 70 degrees or less than about 50 degrees) relative to circumferential surface 65. The shape of apertures 70 may vary considerably. As detailed below, apertures 70 may be cylindrical or rectangular, for example. However, the shape of apertures 70 should not be limited to the described embodiments.

Apertures 70 may be created within mold roll 55 using any of various suitable methods, such as wire EDM, plunge EDM, micro machining, laser cutting, and/or photo etching.

Figure 4:
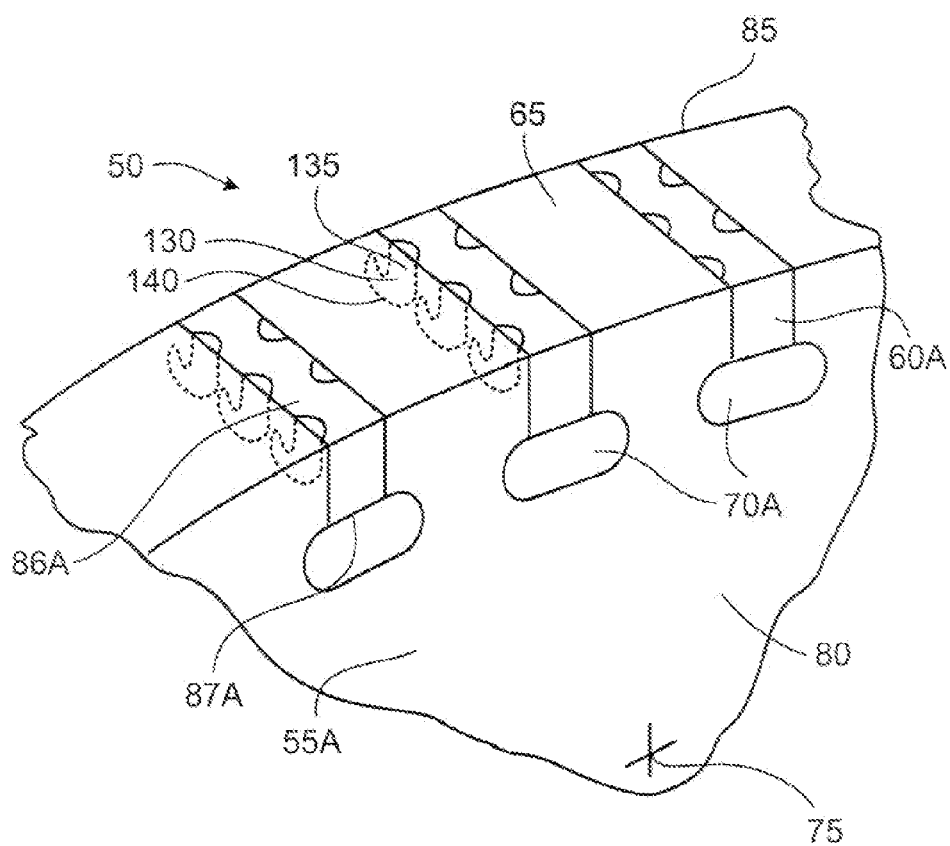
FIG. 4 is a broken perspective view of a region of the outer circumference of the mold roll of FIG. 3.

As shown in FIG. 4, slots 70A extend from one side 80 of mold roll 55A to an opposite side 85 of mold roll 55A. In this embodiment, slots 70A are narrow relative to the diameter of mold roll 55A. For example, slots 70A can have a width of about 0.01 inch to about 0.125 inch.

Blades 60A are retained within slots 70A. One end 86A of each blade 60A is directed toward circumferential surface 65 and another end 87A is directed toward axis of rotation 75. End 86A, which is directed toward circumferential surface 65, can be substantially aligned with circumferential surface 65. This helps to form a smooth upper surface of common base 240 (shown in FIGS. 1 and 2). Blades 60A can have a width between about 0.01 inch and 0.125 inch.

Figure 5:
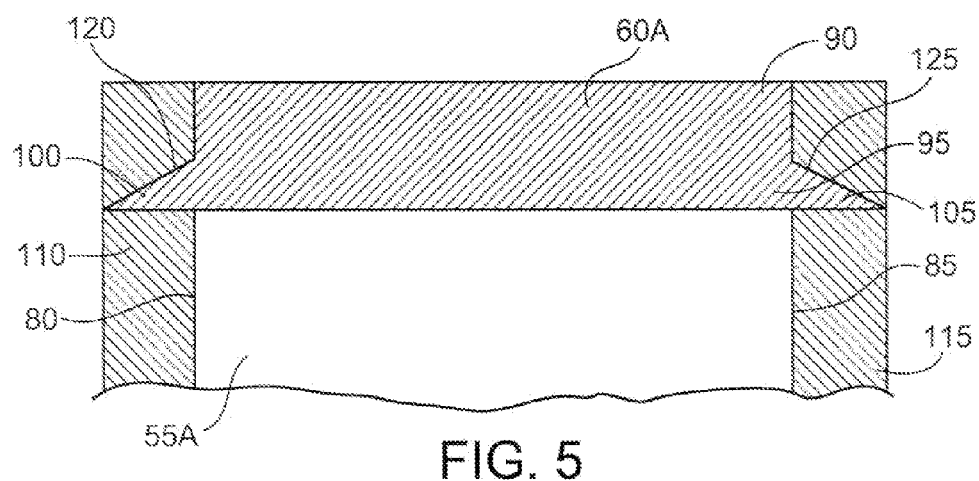
FIG. 5 is a cross-sectional view of an assembled mold roll showing one means of blade retention.

Various suitable methods of retaining blade 60A within slot 70A may be used. Referring to FIG. 5, for example, blade 60A includes an upper portion 90 and a lower portion 95. Lower portion 95 is wider than upper portion 90 such that a segment 100 of lower portion 95 protrudes transversely beyond a first side 80 of mold roll 55A and another segment 105 of lower portion 95 protrudes transversely beyond a second side 85 of mold roll 55A. Retaining caps 110, 115 are coupled to sides 80, 85 of mold roll 55A. Inner surfaces 120, 125 of retaining caps 110, 115 are grooved to accommodate protruding segments 100, 105 of blade 60A to retain blade 60A radially within slot 70A. Thus, when caps 110, 115 are coupled to mold roll 55A, blades 60A are secured in both the lateral and radial direction of mold roll 55A.

Retaining caps 110, 115 and mold roll 55A can be coupled using any of various suitable techniques. For example, mold roll 55A and retaining caps 110, 115 may be threaded and screwed together. Alternatively or additionally they may be held in place by a compressive force applied to each of retaining caps 110, 115 and directed toward mold roll 55A.

Blades 60A can be removed from slots 70A by uncoupling retainer caps 110, 115 from mold roll 55A and either sliding blades 60A out of slots 70A in a sideways direction or lifting blades 60A out of slots 70A in an upwards direction. This, for example, allows for easy replacement, repair, and cleaning of blades 60A.

Referring again to FIG. 4, a plurality of molding cavities 130 are defined between blades 60A and mold roll 55. Each of cavities 130 includes a stem portion 135 and a crook portion 140. Fastener elements having corresponding stems and crooks may be produced when molten resin is forced into cavities 130, allowed to harden, and then removed, as discussed above. Cavities may also be shaped differently to produce fastener stems only, palm-tree-shaped fastener elements, or mushroom-shaped fastener elements, for example.

In order to partially define cavities 130, a group of recesses are created within blade 60A. When blade 60A, which includes multiple recesses in one or more of its side surfaces, is inserted into slot 70A, blade 60A cooperates with mold roll 55A to completely define cavities 130 in those recessed areas. In order to create those recessed areas, a small amount of material is removed from blade 60A. Depending on the size and shape of the desired fastener element, the amount of material removed and the method of its removal may vary. Several suitable methods may be used to create recessed portions of blade 60. For example, wire EDM, plunge EDM, micro machining, laser cutting, and/or photo etching may be used.

Figure 6:
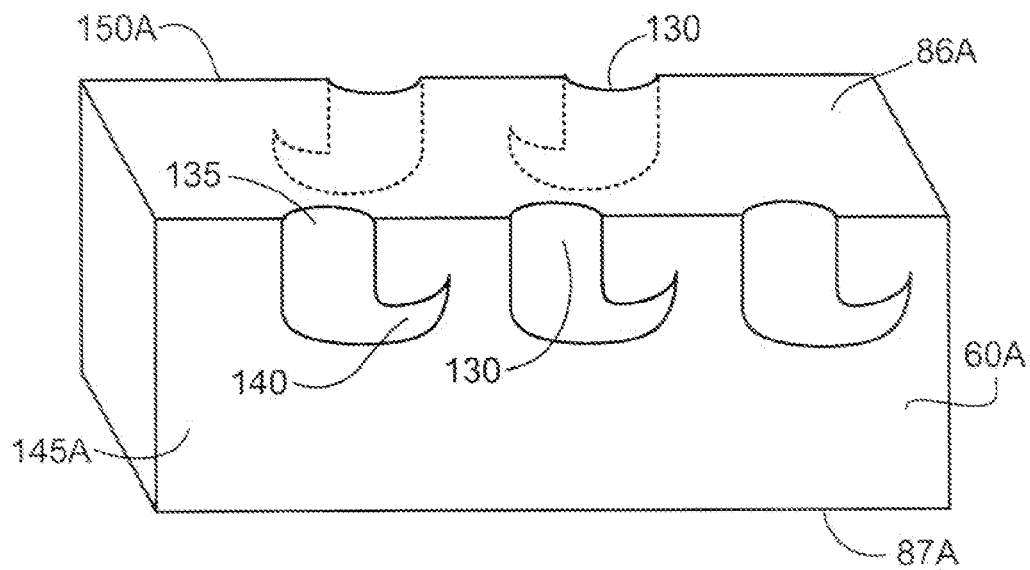
FIG. 6 is a perspective view of a section of an insert blade.

Referring to FIG. 6, material may be removed from each of sides 145A, 150A of blade 60A to partially define cavities 130 on each side 145A, 150A. Of course, material may alternatively be removed from only one of sides 145A, 150A to partially define cavities 130 on only one side of blade 60A.

Figure 7:
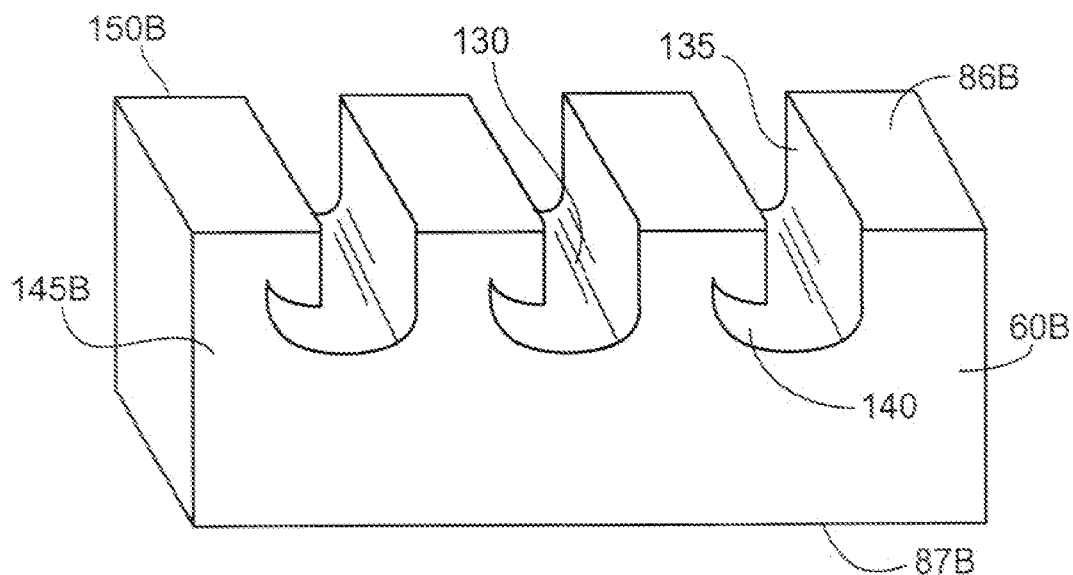
FIG. 7 is a perspective view of a section of another insert blade.

As shown in FIG. 7, material may be completely removed between first side 145B and second side 150B of blade 60B to partially define cavities 130, which extend from first side 145B completely through to second side 150B. Typically, for through-cavities, the material removal process is performed from only one of sides 145B, 150B. However, material can be removed from both sides 145B and 150B.

Figure 8:
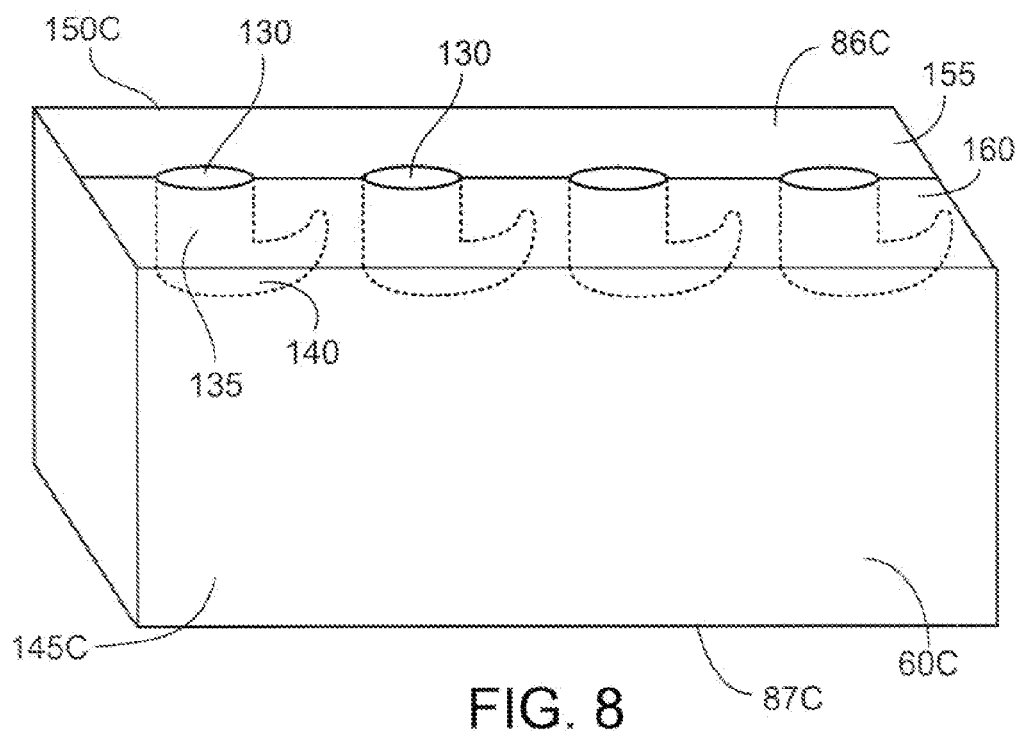
FIG. 8 is a perspective view of a section of a two-piece insert blade.

As shown in FIG. 8, molding cavities 130 may be completely defined within blade 60C. In this embodiment, blade 60C is comprised of a first half 155 and a second half 160. Material is removed from an inner surface of one or both halves 155, 160 to provide a completely defined cavity. Halves 155, 160 are preferably press-fitted within slot 70A. However, any suitable stabilization method capable of preventing movement of halves 155, 160 relative to one another may be used.

It should be noted that blades 60B and 60C may be retained within slots 70A in the same manner as discussed above with respect to blades 60A.

Figure 9:
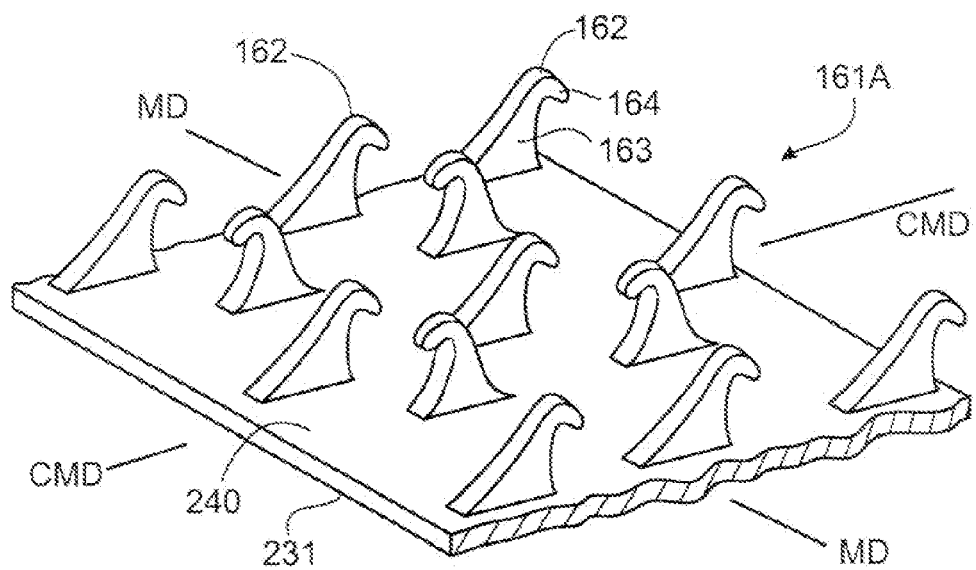
FIG. 9 is a broken perspective view of a fastener product.

Referring to FIG. 9, molding cavities 130 can be used to form fastener elements 162 having crook portions 164. Crook portions 164 of fastener elements 162 are designed to engage with corresponding fastener elements (not shown) in order to provide peel and shear resistance. The corresponding fastener elements may be comprised of any material susceptible to engagement with crook portions 164. Commonly used materials, for example include loop material, non-woven fabric, and self-engaging hooks.

Molding cavities 130 may be configured in various arrangements to produce fastener elements having differing characteristics. Molding cavities 130 may be arranged so that crook portions 140 face in opposite directions, as shown in FIG. 6. This arrangement produces a fastener product 161A with fastener elements 162 having stem portions 163 and crook portions 164 with crook portions 164 facing in opposite directions, as shown in FIG. 9. When an approximately equal number of crook portions 164 face in opposite directions, fastener product 161A will provide substantially equal peel and shear resistance in opposite directions.

Figure 10:
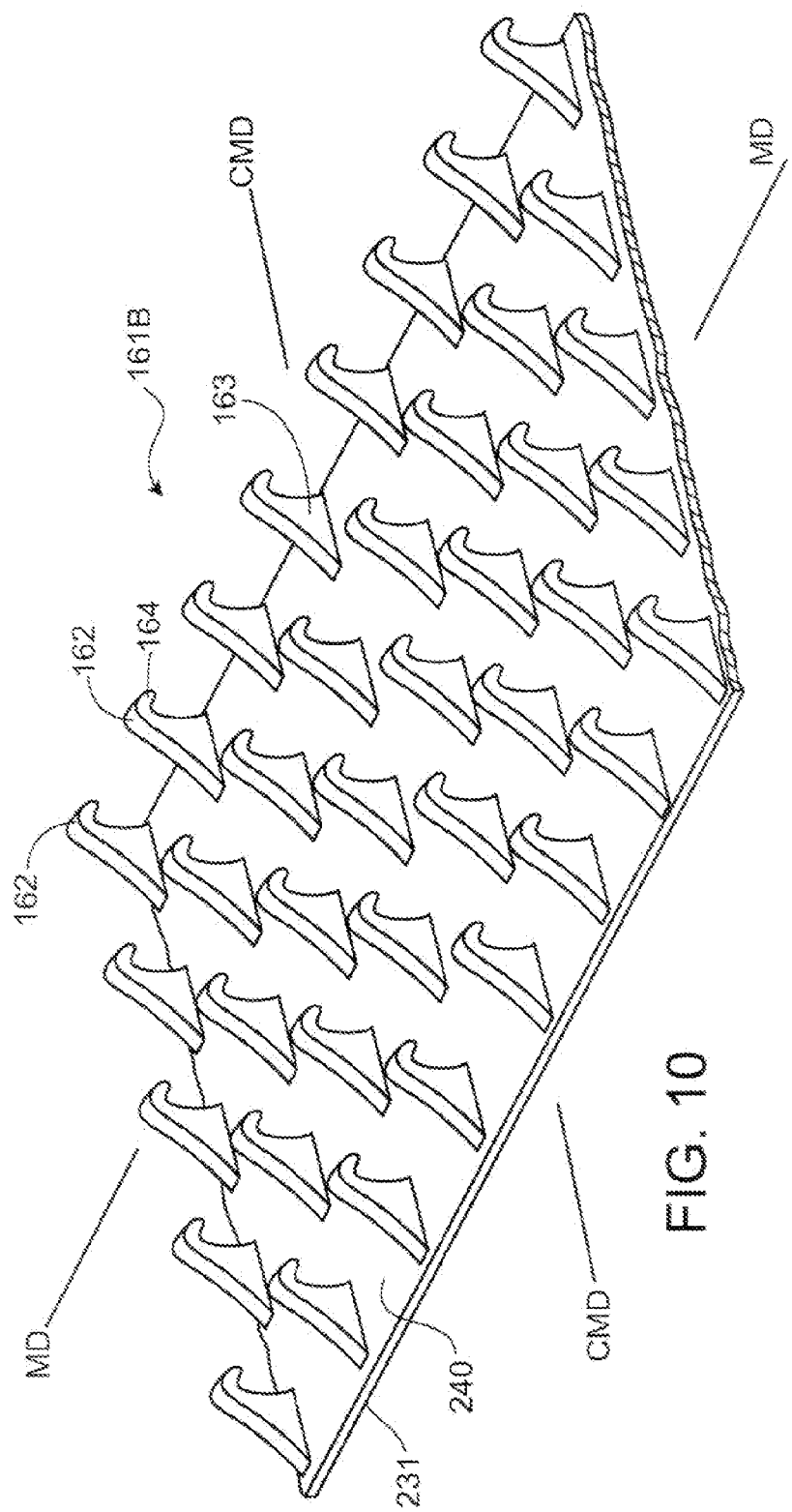
FIG. 10 is a perspective view of a fastener product.

Referring again to FIGS. 7 and 8, molding cavities 30 may be arranged such that all or most of crook portions 140 face in the same direction. The resulting fastener product 161B includes fastener elements 162 with crook portions 164 facing in the same direction, as shown in FIG. 10. This type of fastener product provides very little peel and shear resistance in one direction and a great deal of peel and shear resistance in the opposite direction.

In some embodiments, molding cavities are arranged such that crook portions face in multiple different directions. For example, the molding cavities can be arranged such that crook portions face in substantially every direction along the base of the fastener product. The resulting fastener product, for example, can provide peel and sheer resistance in every direction along the base of the fastener product.

Referring again to FIG. 4, slots 70A and blades 60A are aligned in a transverse direction of mold roll 55. This advantageously enables molding fastener elements 162 having crook portions facing in a cross-machine direction CMD (i.e., transverse to mold roll 55 and perpendicular to the machine direction MD), as shown in FIGS. 9 and 10. Such orientation can be useful for resisting loads applied in a cross-machine direction, such as when the fastener tape is secured across a diaper tab, for example. However, it should be noted that slots 70A and blades 60A, 60B, 60C may be aligned in various other configurations with respect to circumferential surface 65. For example, they may be aligned in machine direction MD or in a direction intermediary to machine direction MD and cross-machine direction CMD. Furthermore, cavities 130 may be aligned in various other configurations within blades 60A, 60B, 60C.

Figure 11:
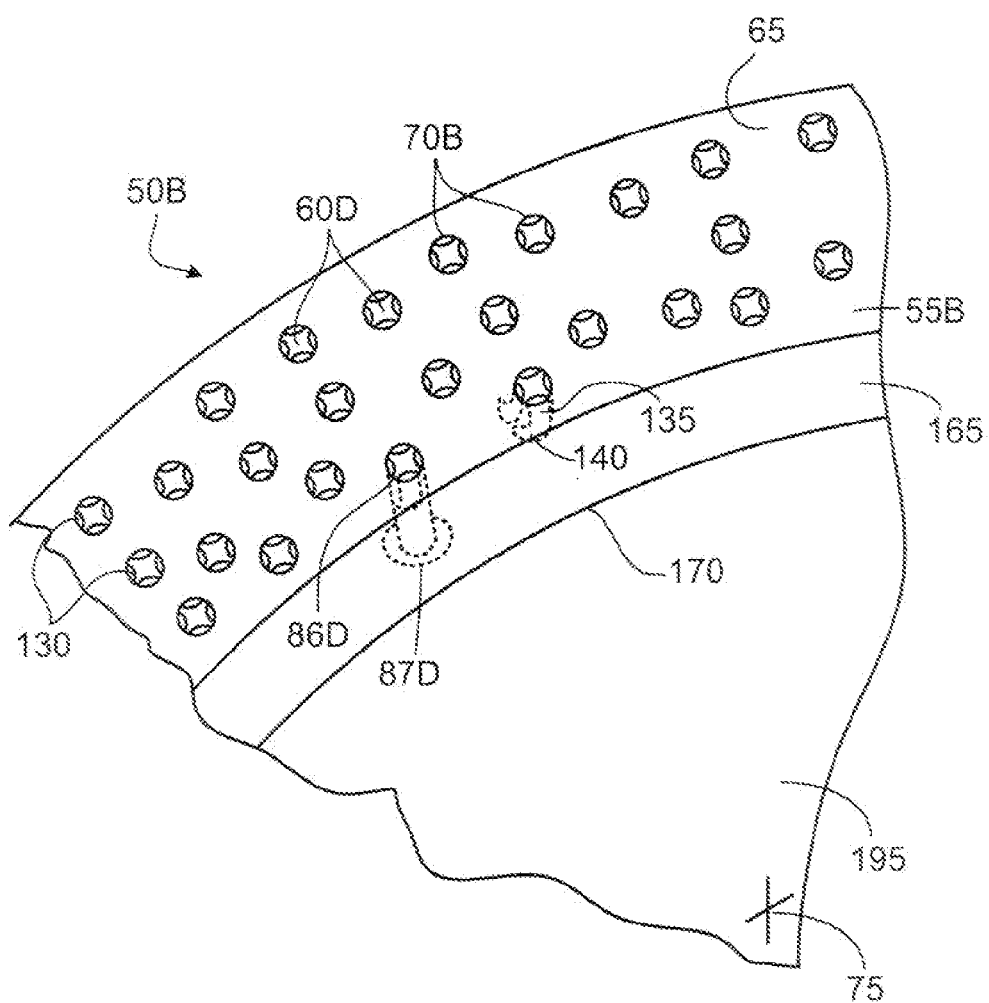
FIG. 11 is a broken perspective view of a second mold roll with plug inserts.

Referring to FIG. 11, another molding apparatus 50B includes a mold roll 55B and multiple inserts or plugs 60D retained therein. Mold roll 55B comprises a sleeve 165, which defines an array of bores 70B. Bores 70B extend from circumferential surface 65 to an inner surface 170 of sleeve 165. Bores 70B may be of various shapes and sizes corresponding to the shapes and sizes of plugs 60D. Bores 70B may be created using any of various suitable methods. For example, bores 70B may be created using drilling, etching, or EDM techniques. Bores 70B are particularly small in diameter. For example, bores 70B can have a diameter of about 0.05 inch to about 0.25 inch.

Figure 12:
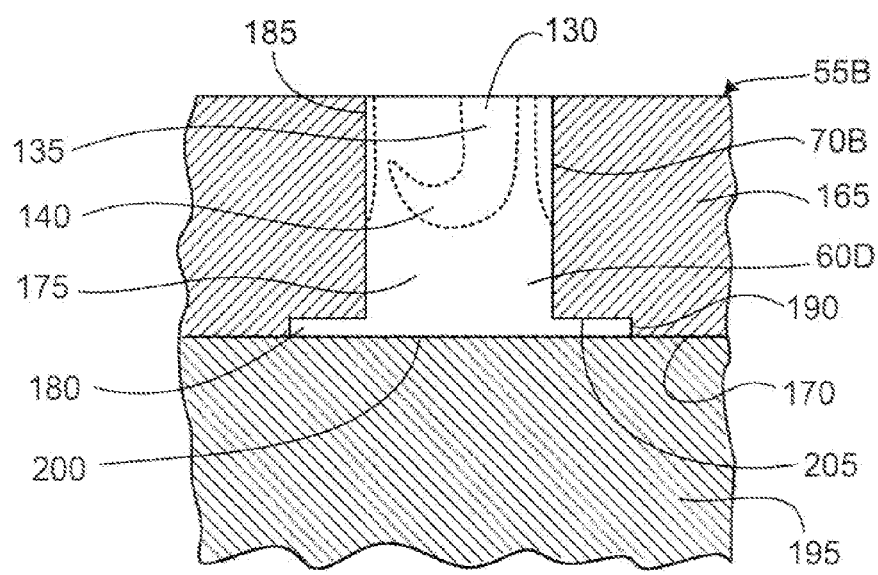
FIG. 12 is a cross-sectional view taken along line 11—11 in FIG. 10.

Plugs 60D may be retained within bores 70B in any of various orientations, which allows for great versatility in the orientation of fastener elements produced. Plugs 60D may be oriented to produce fastener elements having crook portions facing in one or more desired directions. Plugs 60D can have a diameter of between about 0.05 inch and about 0.25 inch. Several suitable methods of retaining plugs 60D within bores 70B may be used. For example, as shown in FIG. 12, plug 60D includes a cylindrical shank 175 with a flange 180 at one end. Bore 70B is comprised of a central portion 185 and a recessed portion 190. Central and recessed portions 185, 190 of bore 70B conform with shank 175 and flange 180 of plug 60D. Plug 60D may be inserted into bore 70B from the direction of inner surface 170 such that shank 175 of plug 60D sits within central portion 185 of bore 70 and flange 180 of plug 60D sits within recessed portion 190 of bore 70B. Sleeve 165 is disposed around a mandrel 195 such that mandrel 195 abuts a bottom surface 200 of plug 60D, while the second portion 180 of plug 60D abuts a recessed inner surface 205 of sleeve 165. Thus, plug 60D is firmly compressed between mandrel 195 and sleeve 165, and thereby retained within bore 70B.

Referring again to FIG. 11, molding cavities 130 are defined between plug 60D and mold roll 55B. Material may be removed from plug 60D using any of the suitable methods discussed above in order to create recesses such that mold roll 55B, in the areas of those recesses, partially define cavities 130. Cavities 130 become fully defined upon inserting plug 60D into bore 70B.

Figure 13:
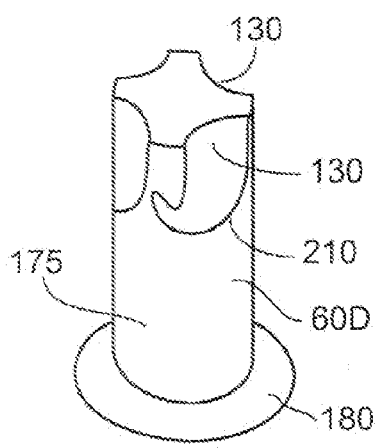
FIG. 13 is a perspective view of one of the inserts shown in FIG. 10.
Figure 16:
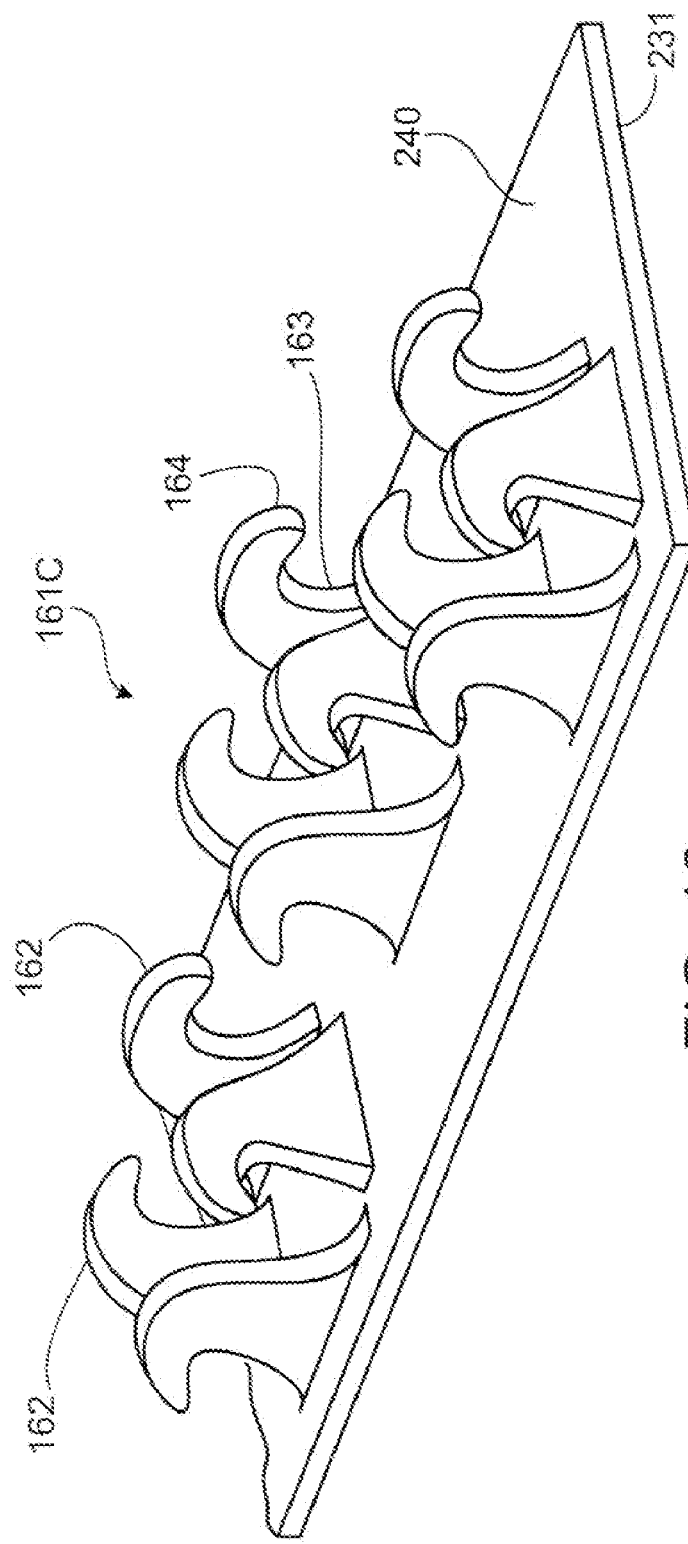
FIG. 16 is a broken perspective view of a fastener product produced with the mold roll of FIG. 11.

As shown in FIGS. 13, multiple molding cavities 130 are arranged along a perimeter surface 210 of plug 60D. All cavities 130 face clockwise about plug 60D, as viewed from the mold roll surface. This enables the molding of a group of fastener elements having crooks oriented in different directions. As a result, fastener product 161C, which provides substantially equal peel and shear resistance in multiple directions, is produced (shown in FIG. 16). As the number of cavities facing in any one direction increases, the amount of peel and shear resistance in that direction also increases.

While the plug shown in FIG. 13, includes four molding cavities 130 that are substantially equally spaced about the circumference of the plug, it should be appreciated that the plug may include more than four molding cavities (e.g., six molding cavities or more). As the number of molding cavities per plug increases, the number of directions in which the resulting product provides peel and sheer resistance can also increase.

Figure 14:
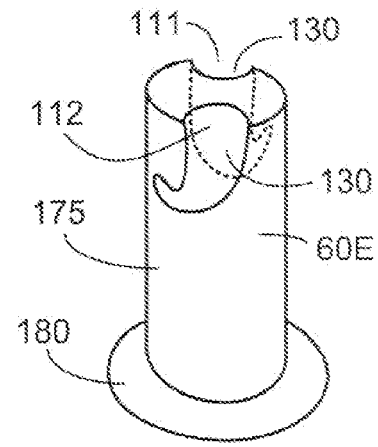
FIG. 14 is a perspective view of a plug insert with two cavities at its circumference.

Referring to FIG. 14, plug 60E includes two partially defined molding cavities 130. Molding cavities 130 are aligned opposite one another at two perimeter portions 111, 112 of plug 60E. Both of crook portions 140 face in a clockwise direction about plug 60E, as viewed from the mold roll surface. Plug 60E, for example, can be used to produce a fastener product with substantially equal peel and shear resistance in opposite directions (similar to the product shown in FIG. 9). In certain embodiments, the opposite molding cavities can be arranged about the plug such that the crook portion of one molding cavity faces in the counter-clockwise direction while the crook portion of the other molding cavity faces in the clockwise direction. This configuration enables the molding of a fastener product that provides peel and shear resistance in substantially only one direction (similar to the product shown in FIG. 10). In certain embodiments, two cavities 130 may be spaced apart circumferentially by about 90 degrees to produce a fastener product that provides peel and shear resistance in a longitudinal direction and in a lateral direction.

Figure 15:
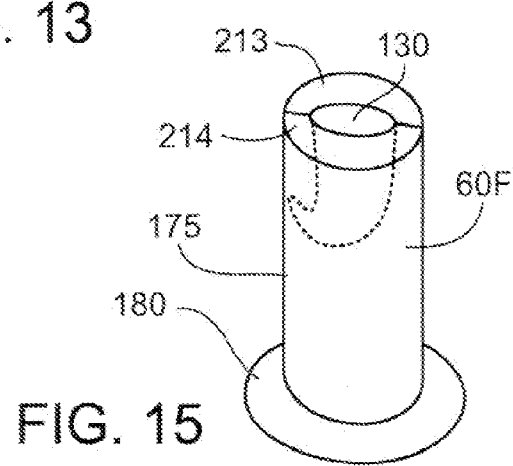
FIG. 15 is a perspective view of a two-piece plug insert.

As shown in FIG. 15, plug 60F may completely define molding cavity 30. Plug 60F is comprised of two halves, a first half 213 and a second half 214. Material is removed from one or both halves 213, 214 so that cavity 130 is defined when halves 213, 214 are joined together within bore 70B. Plug 60F is preferably press-fitted within bore 70B in a manner that prevents halves 213, 214 from moving relative to one another. However, any suitable method of stabilization capable of preventing relative movement between halves 213, 214 may be used.

In any of the embodiments discussed above, plugs 60D, 60E, 60F may be secured in corresponding bores 70B in any rotational orientation. As a result molding cavities 130 may be oriented in any direction relative to the machine direction of processing. Thus, fastener elements orientated in various directions with respect to a fastener product base can advantageously be produced.

The following are incorporated by reference herein in their entirety: U.S. Pat. No. 4,794,028 issued to Fisher; U.S. Pat. No. 5,971,738 issued to Jens et al.; and U.S. Pat. No. 6,202,260 issued to Clune et al.

A number of embodiments of the invention have been described. Nevertheless, it will be understood that various modifications may be made without departing from the spirit and scope of the invention.

What is claimed is:

1. A molding apparatus for forming a sheet-form fastener product, the molding apparatus comprising:
   a mold roll rotatable about an axis of rotation and having a circumferential surface defining a plurality of apertures therein, the apertures extending inward from the circumferential surface of the mold roll; and
   a plurality of inserts, each insert having a first end and a second end, the inserts being capable of being retained within corresponding apertures of the mold roll such that the first end of each insert is directed toward the circumferential surface of the mold roll, the inserts having surfaces at least partially defining blind molding cavities, each of the molding cavities including a crook portion, the molding cavities being shaped to mold, from molten resin forced into the molding cavities from the circumferential surface of the mold roll, an array of fastener elements having overhanging crooks for releasable engagement with a mating fastener product, wherein the inserts can be oriented within the apertures such that at least some of the crook portions of the molding cavities face in a direction transverse to the mold roll.

2. The apparatus of claim 1, wherein the apertures extend along the circumferential surface of the mold roll in a direction substantially parallel to the axis of rotation of the mold roll.

3. The apparatus of claim 2, wherein the apertures extend from a first side of the mold roll to a second side of the mold roll.

4. The apparatus of claim 2, wherein the molding cavities are completely defined within the inserts.

5. The apparatus of claim 4, wherein multiple molding cavities are completely defined within each insert.

6. The apparatus of claim 1, wherein first molding cavities are defined between first sides of the inserts and the mold roll.

7. The apparatus of claim 6, wherein second molding cavities are defined between second sides of the inserts and the mold roll.

8. The apparatus of claim 7, wherein at least some of the first molding cavities include crook portions and at least some of the second molding cavities include crook portions.

9. The apparatus of claim 8, wherein the crook portions of the first molding cavities face in a direction substantially opposite the crook portions of the second molding cavities.

10. The apparatus of claim 8, wherein the crook portions of the first and second molding cavities face in a direction transverse to the mold roll.

11. The apparatus of claim 1, wherein the molding cavities extend from first sides of the inserts to second sides of the inserts.

12. The apparatus of claim 1, wherein the inserts comprise an upper portion and a lower portion, the lower portion including a first segment extending transversely beyond a first side of the mold roll and a second segment extending transversely beyond a second side of the mold roll.

13. The apparatus of claim 12, further comprising a first retainer cap secured to the first side of the mold roll and a second retainer cap secured to the second side of the mold roll, the retainer caps having inner portions conforming to the first and second segments of the inserts to retain the inserts within the apertures.

14. The apparatus of claim 1, wherein each of the inserts has a width of about 0.01 inch to about 0.125 inch.

15. The apparatus of claim 1, wherein the mold roll comprises a sleeve having an inner surface, the array of apertures extending from the inner surface to the circumferential surface of the sleeve.

16. The apparatus of claim 15, wherein the molding cavities are completely defined within the inserts.

17. The apparatus of claim 16, wherein multiple molding cavities are completely defined within each insert.

18. The apparatus of claim 15, wherein the molding cavities are defined by perimeter portions of the inserts and the mold roll.

19. The apparatus of claim 18, wherein multiple molding cavities are defined by the perimeter portion of each insert and the mold roll.

20. The apparatus of claim 19, wherein each of the multiple molding cavities includes a crook portion extending in the same direction along the insert.

21. The apparatus of claim 19, wherein a first molding cavity is defined by a first perimeter portion of each insert and the mold roll, and a second molding cavity is defined by a second perimeter portion of each insert and the mold roll, the second perimeter portion being substantially opposite the first perimeter portion.

22. The apparatus of claim 21, wherein the first molding cavity and the second molding cavity include crook portions, the crook portion of the first molding cavity facing in a direction along the insert opposite the crook portion of the second molding cavity.

23. The apparatus of claim 21, wherein the first molding cavity and the second molding cavity include crook portions, the crook portions of the first and second molding cavities facing in the same direction along the insert.

24. The apparatus of claim 15, wherein the mold roll further comprises a mandrel, the sleeve being disposed around the mandrel.

25. The apparatus of claim 24, wherein the inserts comprise first portions and second portions, the first portions of the inserts being positioned within first portions of the apertures, and the second portions of the inserts being positioned within second portions of the apertures.

26. The apparatus of claim 25, wherein the first portions of the inserts and apertures are substantially cylindrical and the second portions of the inserts and apertures are substantially disk-shaped, the second portions having a larger diameter than the first portions.

27. The apparatus of claim 26, wherein bottom surfaces of the second portions of the inserts are shaped to conform to the mandrel.

28. The apparatus of claim 1, wherein the inserts are configured to be positioned within the apertures in any of a plurality of orientations.

29. A molding apparatus for forming a sheet-form fastener product, the molding apparatus comprising:

a mold roll rotatable about an axis of rotation and having a circumferential surface defining a plurality of apertures therein, the apertures extending inward from the circumferential surface of the mold roll; and a plurality of inserts, each insert having a first end and a second end, the inserts being retained within corresponding apertures of the mold roll such that the first end of each insert is directed toward the circumferential surface of the mold roll, the inserts having surfaces at least partially defining blind molding cavities shaped to mold, from molten resin forced into the molding cavities from the circumferential surface of the mold roll, an array of fastener elements having overhanging heads for releasable engagement with a mating fastener product, wherein the inserts comprise an upper portion and a lower portion, the lower portion including a first segment extending transversely beyond a first side of the mold roll and a second segment extending transversely beyond a second side of the mold roll.

30. The apparatus of claim 29, further comprising a first retainer cap secured to the first side of the mold roll and a second retainer cap secured to the second side of the mold roll, the retainer caps having inner portions conforming to the first and second segments of the inserts to retain the inserts within the apertures.

* * * * *

UNITED STATES PATENT AND TRADEMARK OFFICE
CERTIFICATE OF CORRECTION

PATENT NO. : 7,192,266 B2  Page 1 of 1
APPLICATION NO. : 10/952104
DATED : March 20, 2007
INVENTOR(S) : Christopher M. Gallant, William P. Clune and James W. Babineau It is certified that error appears in the above-identified patent and that said Letters Patent is hereby corrected as shown below:

Cover Page, Item (73) ASSIGNEE:

delete "Velera Industries" and replace with -- Velcro Industries B.V. --

Signed and Sealed this

Tenth Day of June, 2008

JON W. DUDAS
*Director of the United States Patent and Trademark Office*